(No Model.)
C. W. THOMAS.
POWER TRANSMITTING FRICTION CLUTCH PULLEY.
No. 485,513. Patented Nov. 1, 1892.
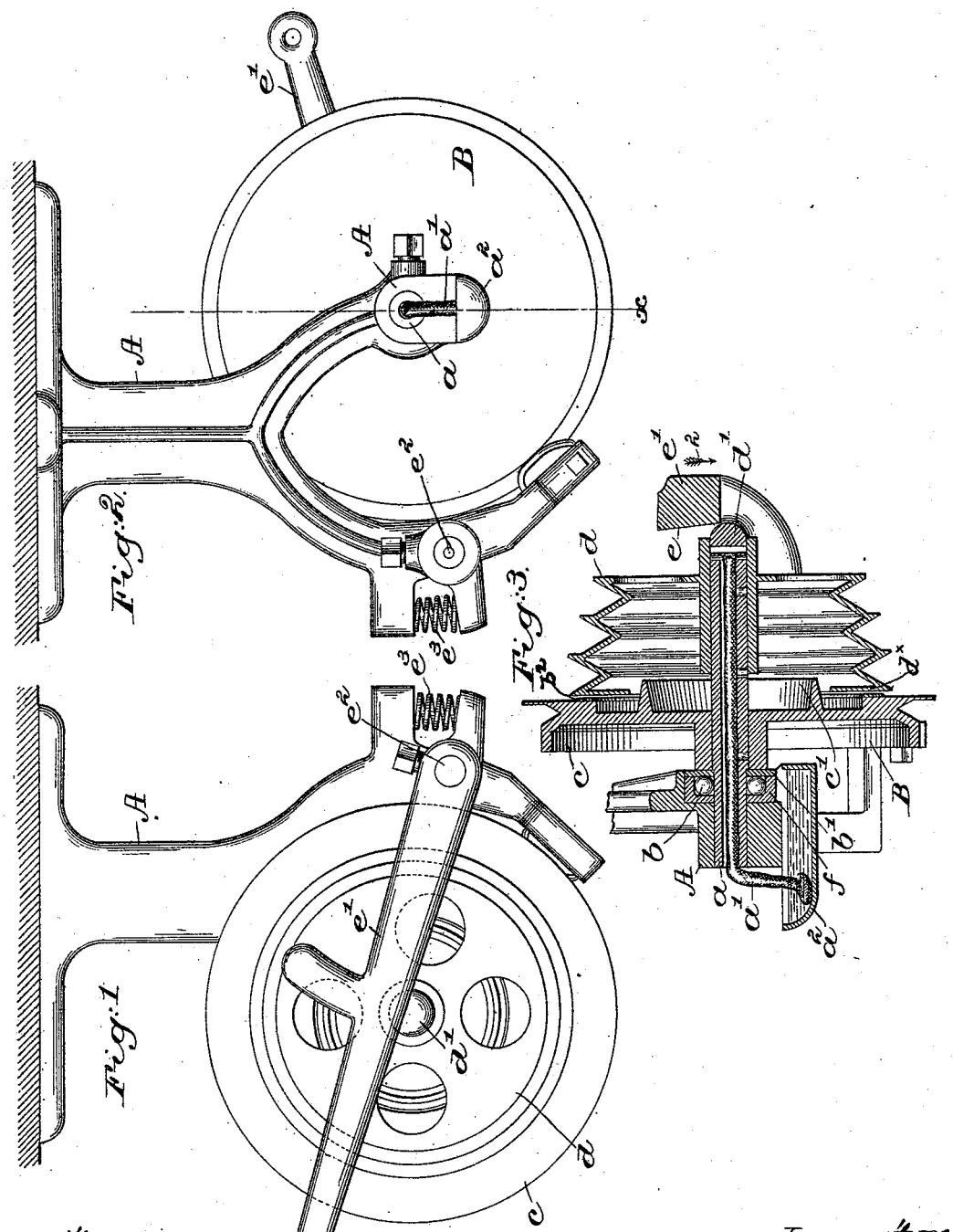
Witnesses.
Fred S. Greenleaf.
Louis N. Sowell
Inventor:
Carlyle W. Thomas.
by Crosby & Gregory
Attys.
THE NORRIS PETERS CO., PHOTO-LITHO., WASHINGTON, D. C.

United States Patent Office.

CARLYLE W. THOMAS, OF BOSTON, MASSACHUSETTS, ASSIGNOR TO THE WHEELER & WILSON MANUFACTURING COMPANY, OF BRIDGEPORT, CONNECTICUT.

POWER-TRANSMITTING FRICTION CLUTCH-PULLEY.

SPECIFICATION forming part of Letters Patent No. 485,513, dated November 1, 1892.

Application filed June 6, 1892. Serial No. 435,636. (No model.)

*To all whom it may concern:*

Be it known that I, CARLYLE WHEELER THOMAS, of Boston, county of Suffolk, State of Massachusetts, have invented an Improvement in Power-Transmitting Friction Clutch-Pulleys, of which the following description, in connection with the accompanying drawings, is a specification, like letters on the drawings representing like parts.

This invention in power-transmitting friction clutch-pulleys has for its object to provide means whereby resistance offered to the rotation of the clutch-pulley about its stud is reduced to the minimum and whereby oil is prevented from escaping onto the floor or from coming against the acting faces of the pulley parts.

Figure 1 is a view of one end of a friction clutch-pulley embodying my invention; Fig. 2, an opposite end view, and Fig. 3 a section in the line $x$.

The support A, of any usual shape, has bearings for one end of a hollow stud $a$, through which is shown as extended a wick or oil feeding device $a'$, one end of which is immersed in oil in the cup or vessel $a^2$, the said hollow stud having lateral openings at intervals to conduct oil to the surface of the stud, said oiled stud receiving on it the hubs of the two parts B C of the power-transmitting clutch-pulley. The frame is provided with an annular chamber surrounding the end of the stud $a$, in which chamber is put a series of antifriction-balls $b$, the said balls, as shown, being sealed in said chamber, and, as herein shown, these balls receive against them, preferably, a washer $b'$, against which rests the inner end of the hub of the pulley part $c$, loose on the said stud and having at its side next the pulley $d$ a friction-surface $b^2$ of leather or other usual material. The pulley $c$ has an annular curb or wall $c'$, which is extended into the center of the pulley $d$, made as a hollow shell, having an inturned flange $d^\times$ to prevent oil which enters the pulley $d$ from escaping therefrom next the pulley $c$.

The hollow hub of the pulley $d$ surrounds the stud $a$ and at one end is provided with a wooden, rawhide, or other rounded plug $d'$, against which acts the inclined face $e$ of the lever $e'$, pivoted at $e^2$, when said lever is turned by the operator in the direction of arrow 2, such movement of the lever causing the inner end of the pulley $d$, driven by a belt from a suitable counter-shaft, to be pressed firmly against the face of and rotate the pulley $c$ with it, said pulley $c$ in practice being belted to the sewing or other machine to be driven. The chamber for the ball-bearings is shown as containing a lining $f$ of steel or other smooth metal. The balls, located as described, enable the pulley $c$ to be run solely by friction against one side of it and be free from the results of friction at its other side.

The oil passed through the hollow stud $a$ to the interior of the hubs of the pulleys $c$ and $d$ is by the curb $c'$ delivered within the interior of the shell-like pulley $d$, the said curb and flange $d^\times$ preventing any oil from passing out between said pulleys and from coming in contact with the leather or other surface between the pulleys $c$ and $d$, as would be the case were it not for the said curb and flange.

Having described my invention, what I claim, and desire to secure by Letters Patent, is—

In a power-transmitting friction or clutch pulley, a hollow pulley part, as $d$, having an inturned flange $d^\times$, combined with a co-operating pulley part having a curb extended from one face thereof into the open side of the other pulley beyond said flange, as and for the purpose set forth.

In testimony whereof I have signed my name to this specification in the presence of two subscribing witnesses.

CARLYLE W. THOMAS.

Witnesses:
   FREDERICK L. EMERY,
   EMMA J. BENNETT.